United States Patent [19]

Nehl et al.

[11] Patent Number: 4,932,526
[45] Date of Patent: Jun. 12, 1990

[54] CONTAINER FOR RECORDING MEDIA

[75] Inventors: Wolfgang Nehl, /Waldachtal/Tumlingen; Wilfried Weber, Unteriflingen, both of Fed. Rep. of Germany

[73] Assignee: fischerwerke Artur Fischer GmbH & Co KG, Tumlingen/Waldachtal, Fed. Rep. of Germany

[21] Appl. No.: 316,493

[22] Filed: Feb. 27, 1989

[30] Foreign Application Priority Data

Feb. 26, 1988 [DE] Fed. Rep. of Germany ....... 3806103

[51] Int. Cl.$^5$ .......................................... B65D 85/672
[52] U.S. Cl. ..................................... 206/387; 206/1.5; 312/12; 312/319
[58] Field of Search ................. 206/1.5, 309, 387, 444; 312/8, 10, 12, 319, 33

[56] References Cited

U.S. PATENT DOCUMENTS

| 4,493,417 | 1/1985 | Ackeret | 206/387 |
| 4,702,372 | 10/1987 | Ackeret | 206/444 |
| 4,702,533 | 10/1987 | Seifert | 312/12 |
| 4,738,361 | 4/1988 | Ackeret | 206/309 |
| 4,743,077 | 5/1988 | Bohnet et al. | 312/12 |

FOREIGN PATENT DOCUMENTS

| 2248408 | 1/1974 | Fed. Rep. of Germany . |
| 3205928 | 9/1983 | Fed. Rep. of Germany . |
| 3329618 | 2/1984 | Fed. Rep. of Germany . |
| 3307451 | 9/1984 | Fed. Rep. of Germany . |
| 85/00345 | 7/1984 | PCT Int'l Appl. . |
| 2144028 | 2/1985 | United Kingdom ................ 206/387 |

Primary Examiner—David T. Fidei
Attorney, Agent, or Firm—Michael J. Striker

[57] ABSTRACT

A container for recording media, such as tape cassettes and the like comprising a housing which is open on at least one of its sides, a slider member arranged to carry a recording medium and insertable into the housing to an inserted position agianst a spring force which can displace the slider member out of the housing to a removal position, locking means arranged to lock the slider member in the housing in the inserted position, and a button operable for unlocking the locking means thereby allowing the spring force to move the slider member from the inserted position to the removal position, the button being pivotable and provided with an operating member which extends in a plane of movement of the slider member between the positions and formed so that the operating member pivots in response to actuation of the button so as to unlock the locking means.

2 Claims, 2 Drawing Sheets

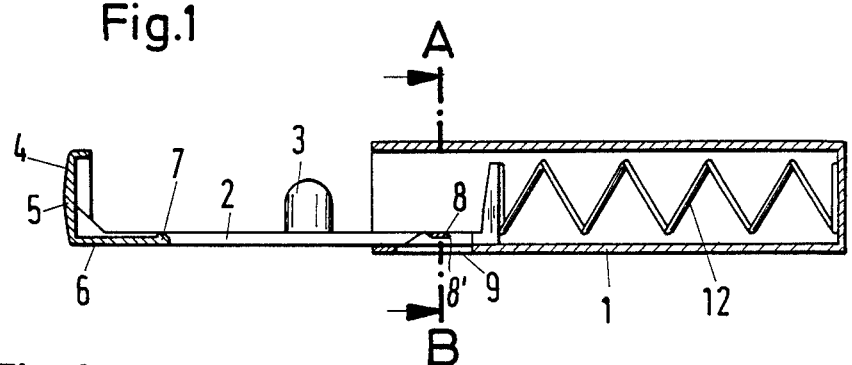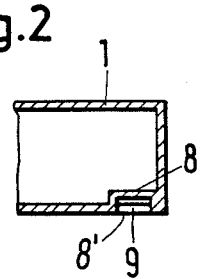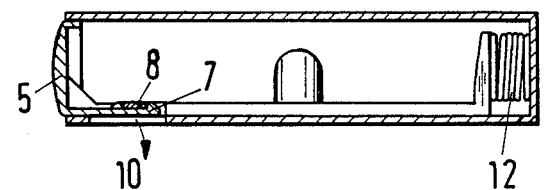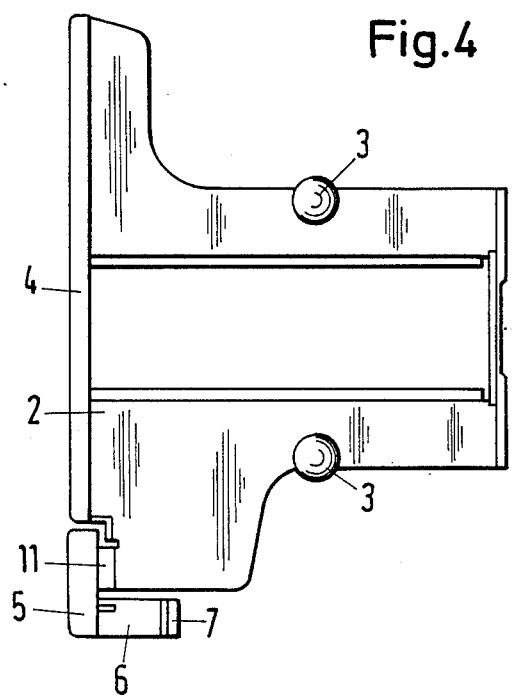

CONTAINER FOR RECORDING MEDIA

BACKGROUND OF THE INVENTION

The present invention relates to a container for tape cassettes or similar recording media. More particularly it relates to such a container of the above mentioned type which has a housing and a slider member which is insertable into the housing against a spring force and displaces the cassette out of the housing to be removed, and wherein the slider has a locking element engageable with a locking edge of the housing and releasable by a button.

Containers of the above mentioned type are known in the art. One of such containers is disclosed for example in the German reference DE-OS 3,114,298. In the container disclosed in this reference which has a housing and a slider member, the tape cassette lies on the slider member and can be pushed out of the housing into a removal position by a spring acting on the slider member. A button is provided in the region of the front panel of the slider member and cooperates with a locking element. When the slider member is pushed completely into the housing, the locking element engages in a recess of the housing. By pressing the button the locking element is disengaged from the recess and the slider member is unlocked and retracted by the spring force into the removal position. For lifting the locking element from the recess of the housing, the button must be displaced in the suitable direction. If a force is applied to the button in a direction of movement of the slider member, it is not sufficient to unlock the slider member. It is to be clear that the above described locking arrangement has some problems as to the manipulation and requires sufficient a gap between the button and the housing for displacement of the button during the unlocking process.

SUMMARY OF THE INVENTION

Accordingly, it is an object of the present invention to provide a container for recording media, which avoids the disadvantages of the prior art.

More particularly, it is an object of the present invention to provide a container for recording media, in which unlocking of the slider member is performed by applying a pressure on the button in direction of movement of the slider member.

In keeping with these objects and with others which will become apparent hereinafter, one feature of the present invention resides, briefly stated, in a container for recording media of the above-mentioned type in which a button provided on a sliding member is pivotable, and the button has an operating member which extends in the plane of movement of the slider member and upon actuation of the button deflects a locking element of the slider member from its locked position.

The operating member which projects from the button in the direction of movement of the slider member is pivoted in response to the actuation of the button preferably upwardly or downwardly. When the operating member pivots it simultaneously deflects the locking element carried by the operating member so that the locking element is deflected from its locking position. The operating member itself may be provided with the locking element. On the other hand, the operating member may be formed separately from a member which carries the locking element. In the latter case the operating member deflects the member which carries the locking element into the unlocking position when the button is actuated.

The button can be mounted on the slider member in a resiliently pivotable manner. For this purpose a resilient element can be provided as a connecting element between the slider member and one of the narrow sides of the button. The resilient element can be formed as a narrow or thin-walled plastic web. When the resilient element is located for example on the top edge of the button, then in response to pressing of the button, the operating member projecting at its underside will be pivoted upwardly. When on the other hand the resilient connection is located on the underside of the button, then the operating member will be pivoted downwardly. The locking elements must be arranged so that in one case the locking element is brought upwardly, and in the other case the locking element is brought downwardly from the locking position to the unlocking position.

The pivotally arranged button with the projecting operating member has the advantage that a force applied to the button in the direction of movement of the sliding member is positively converted into a pivoting movement of the operating member so as to unlock the locking member. A lateral displacement of the button is therefore no longer necessary. Moreover, a wide gap between the button and the adjacent housing is not needed, since the button no longer has to be displaced laterally for unlocking.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 1 is a view showing a longitudinal section of the container for recording media in accordance with the present invention;

FIG. 2 is a view showing a cross-section through a housing of the container of FIG. 1 taken along the line A-B in the region of a locking bar;

FIG. 3 is a view showing the container of FIG. 1 with a slider member in a locked position;

FIG. 4 is a plan view of the slider member of the container of FIG. 1;

DESCRIPTION OF THE PREFERRED EMBODIMENTS

Figure 5:
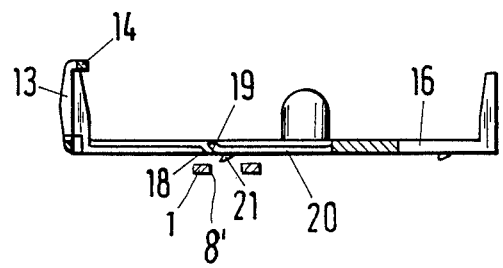
FIG. 5 is a view showing a further embodiment of the slider member with a downwardly directed locking element.

A container for tape cassettes or similar recording media in accordance with the present invention has a housing identified with reference numeral 1 and provided with an open end and a slider member 2 on which the tape cassete is to be placed. The slider member 2 has locking projections 3 which engage in the hubs of both tape spools to safeguard against rotation.

The slider member 2 has a front panel 4 which is provided with a button 5. At its lower end the button 5 has an operating member which extends in the direction of movement of the slider member 2. An upwardly extending locking element 7 is formed on the end of the operating member 6. When the slider member is inserted in the housing, the locking element 7 engages locking edge 8¹ of a locking bar 8. The container in this locked position is shown in FIG. 3.

The housing 1 is provided with an aperture 9 which is located under the locking bar 8. The aperture 9 allows the operating member 6 to pivot downwardly in direction of the arrow 10 shown in FIG. 3, to unlock the slider member 2. The arrangement of the aperture 9 and the locking bar 8 is shown in detail in FIG. 2.

When the pressure is applied to the button 5 its top edge pivots inwardly and the operating member 6 is deflected downwardly in the direction of the arrow 10 in FIG. 3. The locking element 7 is disengaged from the locking bar 8 and the slider member 2 is thereby unlocked from the locked position shown in FIG. 3. A spring 12 which acts against the rear side of the slider member 2 displaces the slider member to the removal position shown in FIG. 1.

Figure 6:
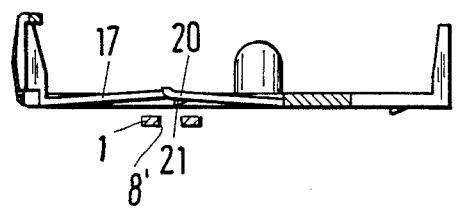
FIG. 6 is a view showing a slider member of FIG. 5 when a button is actuated.
Figure 7:
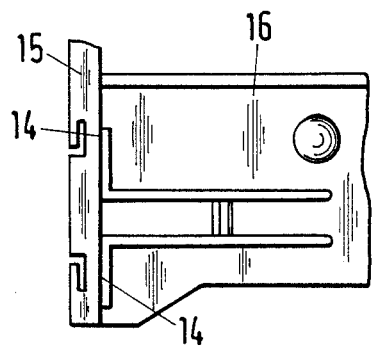
FIG. 7 is a view showing a section of the plan view of the slider member of FIG. 5.

A container in accordance with another embodiment of the invention is shown in FIGS. 5 to 7. In this container a button which is identified with reference numeral 13 is pivotally connected by a resilient web 14 at its top edge with a front panel 15 of a slider member 16. When a pressure is applied to the button 13, its lower region yields backwardly and a member 17 which projects from it moves upwardly to the position shown in FIG. 6. During this movement a slope 18 formed at the end of the operating member 17 engages with a parallel slope 19 provided on an adjacent member 20. The locking element 21 which is provided on the underside of the member 20 is thereby lifted and brought from the locked position to an unlocked position. In the locked position the locking element 21 engages on a locking edge 8¹ in a unshown recess provided in the housing or in a unshown housing opening.

The slider members 2 and 16 are preferably formed as one-piece injection molded plastic parts. Resilient elements 11 and 14 as well as the member 20 resiliently connected to the slider member are composed of the same plastic material as the respective slider members 2 and 16.

It will be understood that each of the elements described above, or two or more together, may also find a useful application in other types of constructions differing from the types described above.

While the invention has been illustrated and described as embodied in a container for recording media, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. A container for recording media, such as tape, cassettes and the like, comprising:
    a housing having a housing aperture and being open on at least one of its sides;
    a slider member arranged to carry a recording medium and insertable into said housing into an inserted position against a spring force which can displace said slider member out of said housing to a removal position;
    locking means arranged to lock said slider member in said housing in said inserted position, said locking means including a locking edge provided in said housing on a lock bar attached to said housing above said housing aperture and a locking element in said slider member engagable on said locking edge; and
    a button pivotally mounted in said slider member, said button having an operating member which extends normally in a plane of movement of said slider member between said inserted position and said removal position and said operating member having said locking element which engages said locking edge of said lock bar in said inserted position and which is positioned adjacent said housing aperture under said lock bar, when said slider member is in said inserted position, said button being pivotable to move said operating member downwardly to said housing aperture and to disengage said locking element from said locking edge thereby allowing said spring force to move said slider member from said inserted position to said removal position.

2. A container for recording media, such as tape cassettes and the like, comprising a housing which is open on at least one of its sides, a slider member arranged to carry a recording medium and insertable into said housing to an inserted position against a spring force which can displace said slider member out of said housing to a removal position; locking mean arranged to lock said slider member in said housing in said inserted position; and a button operable for unlocking said locking means thereby allowing the spring force to move said slider member from said inserted position to said removal position, said button being pivotable and provided with an operating member which extends in a plane of movement of said slider member between said positions and formed so that said operating member pivots in response to actuation of said button so as to unlock said locking means, said housing having a housing aperture, said locking edge of said housing being formed as a locking bar located above said housing aperture, said operating member being insertable under said locking bar and engageable with said locking bar.

* * * * *